H. F. BRAUN
March 10, 1931. FIRE BOX CONSTRUCTION Re. 17,991
Original Filed Oct. 13, 1927
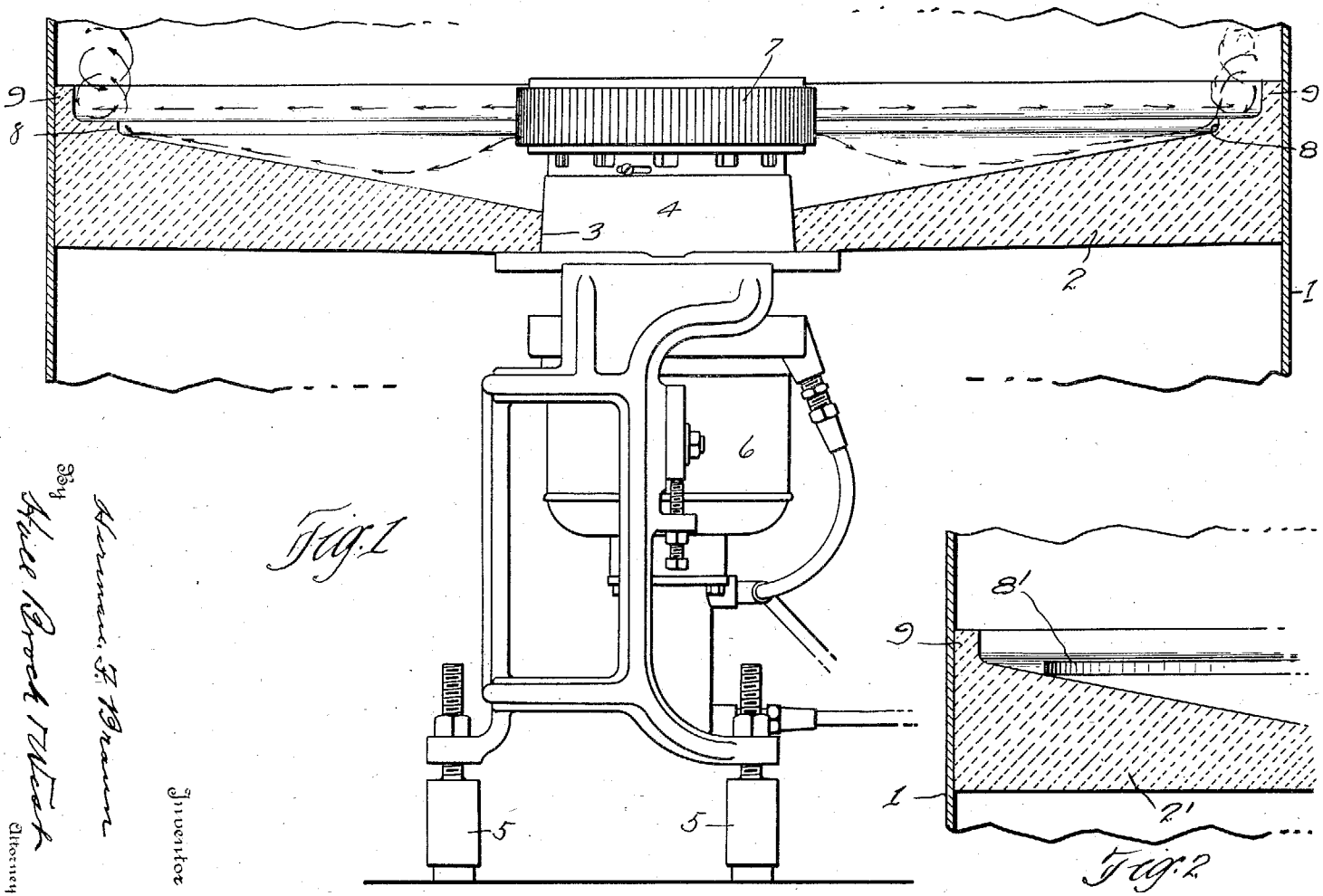
Inventor
Herman F. Braun
By Hull Brock & West
Attorney Reissued Mar. 10, 1931

Re. 17,991

UNITED STATES PATENT OFFICE

HERMAN F. BRAUN, OF CLEVELAND, OHIO, ASSIGNOR TO CLEVELAND STEEL PRODUCTS CORPORATION, OF CLEVELAND, OHIO, A CORPORATION OF OHIO

FIRE-BOX CONSTRUCTION

Original No. 1,715,333, dated May 28, 1929, Serial No. 225,878, filed October 13, 1927. Application for reissue filed January 16, 1931. Serial No. 509,202.

This invention relates generally to household furnaces and more particularly to a novel and improved firebox construction which is especially designed for use in connection with furnaces of the type in which fuel oil is atomized by a rotary atomizing nozzle and delivered to the furnace and burned adjacent the periphery of the firebox.

One of the main objects of the invention is to provide a novel and efficient firebox construction for use with rotary oil burner units of the character referred to and in which the combustion takes place at a point spaced from the burner unit and in the shape of a ring about the peripheral wall of the firebox.

Another object of the invention is to generally improve the efficiency of heating units of this character and to provide for a thorough and efficient mixture of atomized fuel and air.

A further object of the invention is to provide a novel firebox construction in which the bottom or base of the combustion chamber is so shaped and designed as to distribute the air in such a manner that the flame is given a whirling or rolling motion.

Further and more limited objects of the invention will appear as the description proceeds and by reference to the accompanying drawing in which Fig. 1 is a fragmentary view partly in front elevation and partly in vertical section showing a furnace firebox constructed in accordance with my invention and Fig. 2 is a detail fragmentary vertical sectional view showing a modification.

Referring now to the drawings, the reference character 1 designates the vertical side walls of the firebox or combustion chamber of the furnace and 2 designates the bottom or base member which is preferably formed of refractory or heat resisting material. The base member 2 fits within the bottom of the furnace and is provided with a centrally disposed opening 3. Arranged within the opening 3 is a power operated rotary burner unit which consists of hollow casting 4 which is projected through the opening and is supported by a plurality of adjustable legs 5 so that the height of the same may be adjusted. Carried by the legs 5 is an electric motor 6 the shaft of which projects upwardly through casting 4 and has secured thereto a combination oil distributing member and fan 7 having a plurality of fan blades thereon disposed about the periphery thereof. The details of the oil distributing unit are disclosed and claimed in the Laughlin et al. Patent No. 1,655,016, issued January 3, 1928.

The base member 2 is preferably annular in shape and the upper side of the same tapers upwardly from the opening 3 to a point slightly below the plane of discharge of the fuel, as shown by the arrows in Fig. 1, and is there provided with an annular upstanding shoulder 8 which is spaced a slight distance from the periphery of the base member. The periphery of the base member is provided with an annular upstanding peripheral flange 9 which projects a slight distance above the plane of discharge of the fuel. The speed at which the combined distributing head and fan are rotated is so regulated that combustion takes place in the shape of a ring about the periphery of the firebox as indicated by the arrows. The fuel is discharged radially as indicated by the upper series of arrows and a portion of the air drawn in by the fan takes the course indicated by the lower series of arrows. Due to the speed of rotation of the combined fan and distributing head and the peculiar shape of the bottom of the firebox, the flame is given a whirling or rolling motion which results in a most efficient mixture of air and atomized fuel and an extremely hot flame which is evenly distributed over the entire area of the combustion chamber.

I do not wish my invention to be limited to any particular form of distributing head as any type of burner unit employing the same general principle may be used as the main feature of this invention is the shape of the combustion chamber.

In Fig. 2 I have disclosed a slight modification of my invention in which the bottom of the combustion chamber is tapered outwardly all the way to the flange 9 and instead of providing the shoulder 8 as shown in Fig. 1 I provide at this point a ring member 8′ which performs the same function as the shoulder 8 hereinbefore referred to. The ring member 8′ may be rigidly secured in place or it may rest loosely in the bottom of the firebox. The advantage of this form of the invention is that the ring member may be placed within the firebox of furnaces of the type disclosed in the patent hereinbefore referred to and now in general use.

It will now be clear that I have provided a novel firebox construction for furnaces of the character described which will accomplish the objects of my invention as hereinbefore stated. Various changes may be made in the details of construction and in the specific burner unit without departing from the spirit of my invention and I wish my invention to be limited only in accordance with the scope of the appended claims.

Having thus described my invention, what I claim is:—

1. In a furnace of the character described, the combination of a firebox the bottom of which is formed by a substantially annular member composed principally of refractory material, said bottom member having a centrally disposed opening therein, a power operated fuel and air distributing mechanism arranged within said opening and adapted to discharge the fuel in a horizontal plane, the bottom of the fire box tapering upwardly from said opening to a point slightly below the plane of discharge of fuel and there provided with a substantially annular upstanding shoulder spaced a slight distance from the periphery of said substantially annular member.

2. In a furnace of the character described, the combination of a firebox the bottom of which is formed by a substantially annular member composed principally of refractory material, said bottom member having a centrally disposed opening therein, a power operated fuel and air distributing mechanism arranged within said opening and adapted to discharge the fuel in a horizontal plane, the bottom of the firebox tapering upwardly from said opening to a point slightly below the plane of discharge of fuel and there provided with a substantially annular upstanding shoulder spaced a slight distance from the periphery of said substantially annular member, said substantially annular member having an upstanding peripheral flange projecting above the plane of discharge of the fuel.

3. In a furnace of the character described, the combination of a firebox the bottom of which is formed of a substantially annular member composed principally of refractory material and fitting within the fire box, said member having a centrally disposed opening therein, a power operated fuel distributing and atomizing mechanism arranged within said opening, the bottom of the fire box tapering upwardly from said opening and having a substantially annular upstanding shoulder thereon spaced a slight distance from the periphery thereof and below the plane of discharge of fuel, and an upstanding peripheral flange extending above and disposed beyond said substantially annular shoulder.

4. In a furnace of the character described, the combination with a fire box the bottom of which consists of a base member formed of heat resisting material and fitting within the fire box, the said base member being substantially annular in shape and having a centrally disposed opening therein adapted to receive a fuel distributing mechanism therethrough, said base member tapering upwardly from said opening and provided adjacent its periphery with an upstanding substantially annular shoulder spaced from the walls of the firebox and below the plane of discharge of fuel.

5. In a furnace of the character described, the combination with a fire box the bottom of which is formed of a base member composed principally of heat resisting material and fitting within the fire box, said base member being substantially annular in shape and having a centrally disposed opening therein adapted to receive a fuel distributing mechanism therethrough, said base member tapering upwardly from said opening and having an upstanding substantially annular shoulder thereon spaced from the peripheral edge thereof and below the plane of discharge of the fuel.

6. A fire box for furnaces of the character set forth comprising a base member composed principally of heat resisting material and forming the bottom of the furnace and having a centrally disposed opening therein adapted to receive a burner unit therethrough, said base member being substantially annular in shape and having a substantially annular peripheral flange disposed adjacent the walls of the fire box and a substantially annular shoulder spaced from said peripheral flange and below the plane of discharge of fuel, that portion of said base member between said shoulder and opening tapering downwardly toward said opening.

7. A fire box for furnaces of the character described comprising a base member composed principally of refractory material and forming the bottom of the fire box and having an opening in its bottom adapted to receive a burner unit therethrough, the said bottom tapering upwardly from said opening and formed adjacent its periphery with a substantially annular shoulder and a horizontally disposed portion, the said horizontally disposed portion being disposed a slight distance below the upper edge of said base member and below the plane of discharge of fuel.

8. In a fire box for furnaces of the character described, a base member forming the bottom of the fire box, said base member having a centrally disposed opening adapted to receive a burner unit therethrough, said bottom tapering upwardly from said opening and having an upstanding peripheral flange disposed adjacent the side walls of the fire box and an upstanding substantially annular shoulder spaced from and slightly below said peripheral flange and below the plane of discharge of fuel.

9. In a furnace construction of the character described, a firebox, the bottom of which is formed of a member composed principally of heat resisting material, said bottom member having a centrally disposed opening therein adapted to receive a rotary fuel and air distributing member, the said bottom member tapering upwardly and outwardly from said opening and having means disposed adjacent the periphery thereof and so disposed with respect to the plane of discharge of fuel and air as to impart a whirling motion to the flame.

10. In a furnace construction of the character described, a fire box, the bottom of which is formed of a member composed principally of heat resisting material, said bottom member having a centrally disposed opening therein adapted to receive a rotary fuel and air distributing member therethrough, the said bottom member tapering upwardly and outwardly from said opening, the peripheral portion thereof being so shaped and disposed with respect to the plane of discharge of fuel and air as to impart a whirling motion to the flame.

11. In a furnace of the character described, the combination of a fire box the bottom of which includes a substantially annular hearth, a centrifugal distributing head projecting upwardly through said bottom, said hearth being stepped to provide two substantially vertical faces near the periphery of said bottom, one above and outward of the other, the upper said face intersecting the trajectory of fuel thrown outwardly by said distributing head.

12. In a furnace of the character described, the combination of a fire box the bottom of which includes a substantially annular hearth, a centrifugal distributing head projecting upwardly through said bottom, said hearth being stepped to provide two substantially vertical faces near the periphery of said bottom, one above and outward of the other, the upper said face intersecting the trajectory of fuel thrown outwardly by said distributing head, said lower face constituting an uninterrupted surface intersecting the upper surface of said bottom.

In testimony whereof I hereunto affix my signature.

HERMAN F. BRAUN.